Figure 1:
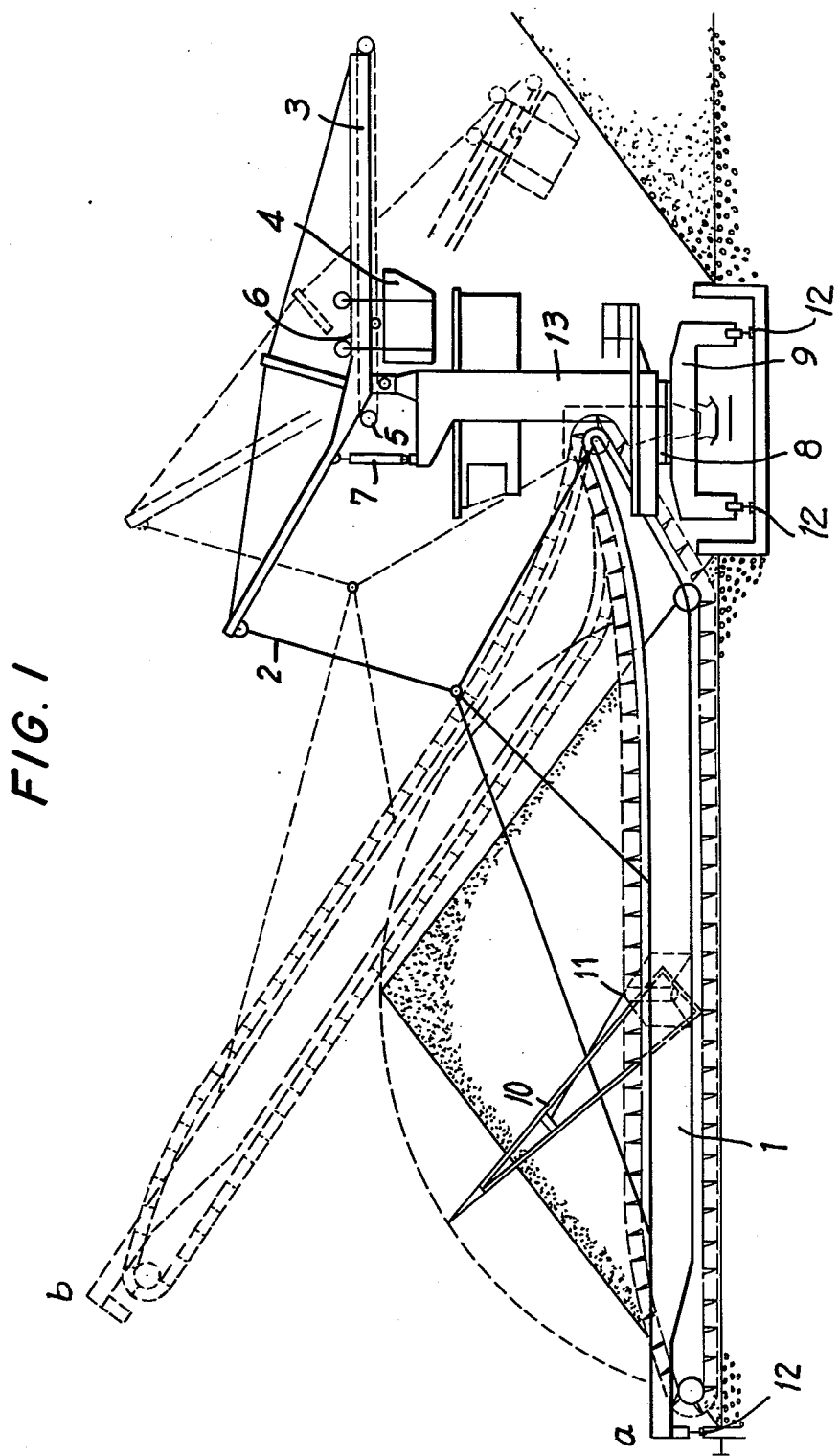

United States Patent [19]

Gehring et al.

[11] 4,120,408
[45] Oct. 17, 1978

[54] BRIDGE SCRAPER

[75] Inventors: Karl Gehring, St. Ingbert; Kurt Kamm, St. Ingbert-Hassel, both of Fed. Rep. of Germany

[73] Assignee: Pohlig-Heckel-Bleichert Vereinigte Maschinen-Fabriken, Cologne, Fed. Rep. of Germany

[21] Appl. No.: 804,273

[22] Filed: Jun. 7, 1977

[30] Foreign Application Priority Data

Jun. 18, 1976 [DE] Fed. Rep. of Germany ....... 2627392

[51] Int. Cl.² .............................................. B65G 65/28
[52] U.S. Cl. ...................................... 214/10; 198/519; 198/520
[58] Field of Search ................... 214/10; 198/511, 519, 198/520; 37/191 R, 192 R

[56] References Cited

U.S. PATENT DOCUMENTS 4,037,735  7/1977  Althoff .................................. 214/10

FOREIGN PATENT DOCUMENTS 2,521,715  5/1975  Fed. Rep. of Germany ............. 214/10

*Primary Examiner*—Albert J. Makay
*Assistant Examiner*—George F. Abraham
*Attorney, Agent, or Firm*—Haseltine, Lake & Waters

[57] ABSTRACT

A bridge scraper is mounted on a main frame for vertical pivotal movement between a raised inoperative position and an operative position, where the bridge extends generally horizontally and is in wheeled engagement with an outer track of a dump, a scraper chain carried by the bridge extends along the bridge and in an operative position scrapes bulk material from the dump toward the main frame. A slope-breaking assembly is carried by the bridge and is engageable with the dump when the bridge is operative, a rocker mounted on the frame for vertical pivotal movement, has a counterweight arm extending away from the bridge, a linkage connecting the rocker to the bridge is arranged to hold the counterweight arm in a substantially horizontal position when the bridge is operative and imparts a downward pivotal movement to the counterweight arm as said bridge is raised. A bridge-actuating arrangement moves the bridge between inoperative and operative positions.

8 Claims, 2 Drawing Figures

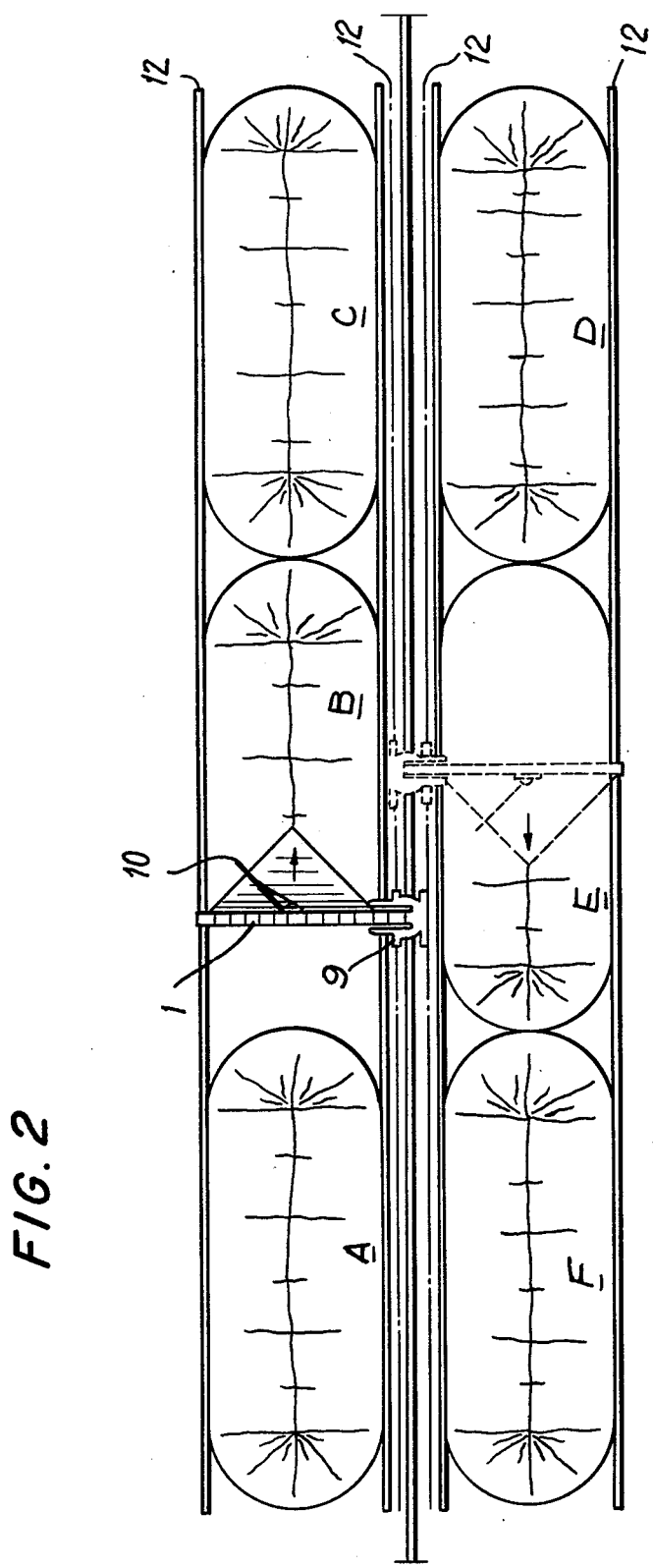

BRIDGE SCRAPER

This invention relates to a bridge scraper for taking bulk material, particularly for taking bulk material from a plurality of dumps which are disposed behind and beside each other and contain different bulk materials, comprising a scraper chain mounted in a bridge, which is movable on wheels on outer and inner tracks, which extend along the dump or dumps on opposite sides thereof, and slope-breaking means mounted on the bridge, said scraper chain extending horizontally substantially throughout the width of the dump and having a lower course for scraping bulk material from the dump and delivering said bulk material to a discharge belt conveyor.

In known equipment for taking bulk material from a plurality of dumps (Opened German Specification 1,781,131), the bulk material is removed and conveyed from the top of the dump, although this practice will not ensure an adequate homogenization and does not enable a removal of bulk material from a relatively large number of dumps disposed beside or behind each other.

It is an object of the invention to provide a bridge scraper which is of the kind defined first hereinbefore and particularly suitable for a preparation of blended materials in the cement industry or in the dressing of ore and which is so designed that it can take bulk materials at a relatively high rate and with a relatively favourable homogenization effect from a plurality of dumps, which are disposed beside and behind each other and contain different bulk materials.

This is accomplished in accordance with the invention in that the ridge is mounted on a main frame for vertical pivotal movement between an operative position "a," in which the bridge is disposed near the base of the dump, and an inoperative position "b," a rocker is mounted on said main frame for vertical pivotal movement and is connected to the bridge by a linkage, which holds an arm of the rocker in a horizontal position opposite to the bridge when the latter is in its operative position and which causes said arm of the rocker to perform a downward pivotal movement during a movement of the bridge to is inoperative position, counterweight tracks are carried by said arm of the rocker, said rocker carries also control means which control the movement of a wheeled counterweight along said counterweight tracks and the counterweight is movable on the counterweight tracks to an outermost position, opposite to the bridge, when it is desired to raise the bridge.

To move the bridge between its operative and inoperative positions, a substantially vertical hydraulic actuator is provided, which is disposed below the rocker and connected between the rocker and the main frame.

The bridge scraper suitably comprises a portal, which is movable on wheels, and a thrust ball bearing, which is mounted on top of the portal and about which the bridge is pivotally movable when the bridge is in a raised position. It has found to be desirable to provide a slope-breaking member in the form of a rigid rake, which is pivoted to the bridge at the center of its length and extends throughout the height of the dump of bulk material and is pivotally movable over the end face of the dump.

Further advantages and features of the invention will become apparent from the following description of an embodiment shown by way of example on the accompanying drawings, in which FIG. 1 is a front elevation showing the equipment and FIG. 2 is a top plan view thereof.

The bridge scraper is provided with a scraper chain accommodated in a bridge 1 and with outer and inner tracks 12, which extend along the dumps and on which the equipment is movable on wheels. The bridge 1 is vertically pivotally movable from an operative position "a," in which the bridge extends horizontally near the base of the dump of bulk material, to an inoperative position "b," in which the equipment can be transversely moved to the next dump. A linkage 2 is disposed above the bridge, which is vertically pivotally movable and is connected by said linkage to a rocker, which is pivoted to a frame or column 13 for vertical pivotal movement. The linkage 2 holds the rocker arm 3 of the rocker in a substantially horizontal position when the bridge is in its operative position "a" and causes the rocker arm 3 to perform a downward pivotal movement during a movement of the bridge 1 to its inoperative position "b," which is indicated in dotted lines in FIG. 1. Counterweight tracks 6 are carried by the rocker arm 3. The rocker carries also drive means 5 or other control means for controlling the movement of a wheeled counterweight 4 along the tracks 6. A substantially vertically extending hydraulic actuator 7 is mounted on the frame 13 and disposed below the rocker 3 and connected thereto.

When the hydraulic actuator 7 is to be operated to raise the bridge 1, the counterweight 4 is moved away from the bridge along the counterweight tracks 6 to an outermost position.

The bridge scraper comprises a portal 9, which is movable on wheels along the inner tracks 12 and carries at its top a thrust ball bearing 8, that is known per se and permits of a pivotal movement of the bridge scraper e.g., from a dump C to a dump D as the scraper moves along the inner tracks 12.

A rigid slope-breaking rake 10 is pivoted to the bridge 1 along a vertical axis 11 at the center of the length thereof, the rake extending along the end face of the dump throughout the height thereof.

What is claimed is:

1. A bridge scraper for taking bulk material from at least one dump disposed between outer and inner tracks extending on opposite sides of said dump, said bridge scraper comprising a main frame in wheeled engagement with and movable along said inner track, a scraper bridge mounted on said main frame for vertical pivotal movement between a raised inoperative position and an operative position, in which said bridge extends generally horizontally and is in wheeled engagement with said outer track, a scraper chain carried by said bridge and having a lower course which extends along said bridge and in said operative position of said bridge is operable to scrape bulk material from said dump at the base thereof toward said main frame, slope-breaking means carried by said bridge and engageable with said dump above said base thereof when said bridge is in said operative position, a rocker mounted on said frame for vertical pivotal movement and having a counterweight arm extending away from said bridge, a linkage connecting said rocker to said bridge and arranged to hold said counterweight arm in a substantially horizontal position when said bridge is in said operative position and to impart to said counterweight arm a downward pivotal movement as said bridge is raised, bridge-actuating means operable to move said bridge between said inoperative and operative positions, counterweight tracks carried by and extending along said counterweight arm, a counterweight carried by and in wheeled engagement with and movable along said counterweight tracks and adapted to urge said bridge toward said inoperative position, and control means carried by said rocker and operable to control the movement of said counterweight along said arm, whereby said counterweight is movable outwardly along said counterweight for an increased mechanical advantage when the bridge is to be raised.

2. A bridge scraper as set forth in claim 1, which is adapted to take bulk material in succession from a plurality of dumps which contain different bulk materials and are arranged in a row between said inner and outer tracks.

3. A bridge scraper as set forth in claim 1, in which said bridge-actuating means comprise a substantially vertically extending hydraulic actuator connected between said rocker and said frame.

4. A bridge scraper as set forth in claim 1, for taking bulk material from two dumps which contain different bulk materials and are disposed between an inner track and respective outer tracks disposed on opposite sides of said inner tracks, in which said main frame comprises a portal in wheeled engagement with said inner track, a thrust ball bearing mounted on top of said portal, and an upper frame stricture connected to said portal by said thrust ball bearing for rotation on a vertical axis, and
said bridge and rocker are pivoted to said upper frame structure,
whereby said bridge is pivotally movable from one side of said inner track to the other when said bridge is in said inoperative position.

5. A bridge scraper as set forth in claim 1, in which said slope-breaking means comprise an upwardly inclined, rigid rake, which is pivoted to said bridge adjacent to the center of the length thereof and is adapted to extend throughout the height of said dump.

6. A bridge scraper installation for taking bulk material from at least one dump, comprising
an inner track,
at least one outer track which is parallel to and spaced from said inner track,
a main frame in wheeled engagement with and movable along said inner track,
a scraper bridge mounted on said main frame for vertical pivotal movement between a raised inoperative position and an operative position, in which said bridge extends generally horizontally and is in wheeled engagement with said outer track,
a scraper chain carried by said bridge and having a lower course which extends along said bridge and in said operative position of said bridge extending substantially throughout the distance from said main frame to said outer track and operable to scrape bulk material from the base of a dump disposed between said inner and outer tracks and to move said bulk material toward said main frame,
slope-breaking means carried by said bridge and engageable with said dump above said base thereof when said bridge is in said operative position,
a rocker mounted on said frame for vertical pivotal movement and having a counterweight arm extending away from said bridge,
a linkage connecting said rocker to said bridge and arranged to hold said counterweight arm in a substantially horizontal position when said bridge is in said operative position and to impart to said counterweight arm a downward pivotal movement as said bridge is raised,
bridge-actuating means operable to move said bridge between said inoperative and operative positions,
counterweight tracks carried by and extending along said counterweight arm,
a counterweight carried by and in wheeled engagement with and movable along said counterweight tracks and adapted to urge said bridge toward said inoperative position, and
control means carried by said rocker and operable to control the movement of said counterweight along said arm,
whereby said counterweight is movable outwardly along said counterweight for an increased mechanical advantage when the bridge is to be raised.

7. A bridge scraper installation as set forth in claim 6, in which
a discharge belt conveyor is provided adjacent to said main frame and extends parallel to said tracks and
said lower course is adapted to deliver said scraped bulk material to said discharge belt conveyor.

8. A bridge scraper installation as set forth in claim 6, in which
said inner track comprises two track rails,
first and second outer tracks are provided, which are parallel to and spaced from said inner track and disposed on said opposite sides thereof,
said main frame comprises a portal in wheeled engagement with both said inner track rails, a thrust ball bearing mounted on top of said portal, and an upper frame structure connected to said portal by said thrust ball bearing for rotation on a vertical axis, and
said scraper bridge and said rocker are pivoted to said upper frame structure,
whereby said bridge is pivotally movable from one side of said inner track to the other when said bridge is in said inoperative position and said bridge is adapted to assume first and second operative positions in which it is in wheeled engagement with said first and second outer tracks, respectively.

* * * * *